United States Patent
Schambre et al.

(10) Patent No.: US 6,886,878 B2
(45) Date of Patent: May 3, 2005

(54) MOTOR VEHICLE SEAT WITH TWO PIVOT AXES

(75) Inventors: John E Schambre, Canton, MI (US); Rudi Krajcirovic, Royal Oak, MI (US); Marcus G Washington, Southfield, MI (US); Liliana Neag, Walled Lake, MI (US); Michael O Forker, Novi, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 528 days.

(21) Appl. No.: 10/146,615

(22) Filed: May 15, 2002

(65) Prior Publication Data

US 2004/0256876 A1 Dec. 23, 2004

(51) Int. Cl.[7] ................................................ B60N 2/10
(52) U.S. Cl. ........................ 296/65.09; 297/12; 297/335
(58) Field of Search ....................... 296/65.09; 297/331, 297/335, 378, 12

(56) References Cited

U.S. PATENT DOCUMENTS

| | | | |
|---|---|---|---|
| 1,747,717 A | * | 2/1930 | Hummert |
| 2,523,990 A | * | 9/1950 | Liljengren et al. |
| 4,519,646 A | | 5/1985 | Leitermann et al. |
| 4,572,569 A | | 2/1986 | Habmann |
| 4,740,030 A | * | 4/1988 | Nordskog |
| 4,779,917 A | | 10/1988 | Campbell et al. |
| 4,877,282 A | | 10/1989 | Yamauchi |
| 5,269,581 A | | 12/1993 | Odagaki et al. |
| 5,482,346 A | | 1/1996 | Lesourd |
| 5,489,141 A | * | 2/1996 | Strausbaugh et al. |
| 5,492,389 A | | 2/1996 | McClintock et al. |
| 5,707,103 A | * | 1/1998 | Balk |
| 5,868,451 A | | 2/1999 | Uno et al. |
| 5,984,397 A | * | 11/1999 | Dawson et al. |
| 6,460,929 B2 | * | 10/2002 | Kamida |

* cited by examiner

*Primary Examiner*—Joseph D. Pape
(74) *Attorney, Agent, or Firm*—Ralph E. Smith

(57) ABSTRACT

A seat assembly for a motor vehicle comprises a seat cushion frame, a seatback, and a leg. The seat cushion frame has an outboard end pivotally mounted to a fixed support proximate a side wall of the vehicle, and the seatback is pivotally connected to the seat cushion frame. The leg is pivotally mounted to the inboard end of the seat cushion frame and includes a latch mechanism for securing to the vehicle floor. A brace is pivotally connected to the leg and to the fixed support proximate the side wall, so that the seat cushion frame, leg, brace and fixed support act a parallel linkage to move as a unit from a use position to a stowed position of the seat assembly. The assembly is held in the stowed position by a pin that engages the brace to prevent its pivoting relative to the fixed support.

8 Claims, 4 Drawing Sheets

MOTOR VEHICLE SEAT WITH TWO PIVOT AXES

TECHNICAL FIELD OF THE INVENTION

This invention relates generally to seats for motor vehicle seats, and relates more specifically to a seat having two pivot axes.

BACKGROUND OF THE INVENTION

Many motor vehicles, particularly sport utility vehicles and minivans, are equipped with rear seats that can be moved from a seating configuration, in which passengers can sit in the seat, to a so-called "load floor" configuration where the back support of the seat is folded downwardly to assume a horizontal orientation and thereby facilitate cargo stowage. Typically, locking mechanisms are provided for holding the seat in the seating configuration, and the locking mechanisms can be released to permit moving the seat to the load floor configuration.

It has also been proposed to provide a seat that stows in a vertical position. U.S. Pat. No. 5,492,389 shows a stowable seat having a cantilevered seatbase with a range of motion extending from a horizontally deployed position to a vertically stowed position.

SUMMARY OF THE INVENTION

The present invention is a seat assembly for a motor vehicle. The seat assembly comprises a seat cushion frame, a seatback, and a leg. The seat cushion frame has an outboard end pivotably mounted proximate a side wall of the vehicle, and the seatback is pivotably connected to the seat cushion frame. The leg is pivotably mounted to the inboard end of the seat cushion frame.

Accordingly, it is an object of the present invention to provide a seat assembly of the type described above can be moved to a seating configuration and to a load floor configuration.

Another object of the present invention is to provide an assembly of the type described above that enables easier ingress and egress for back row seat occupants.

Still another object of the present invention is to provide an assembly of the type described above which is easy to use and cost-effective.

These and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
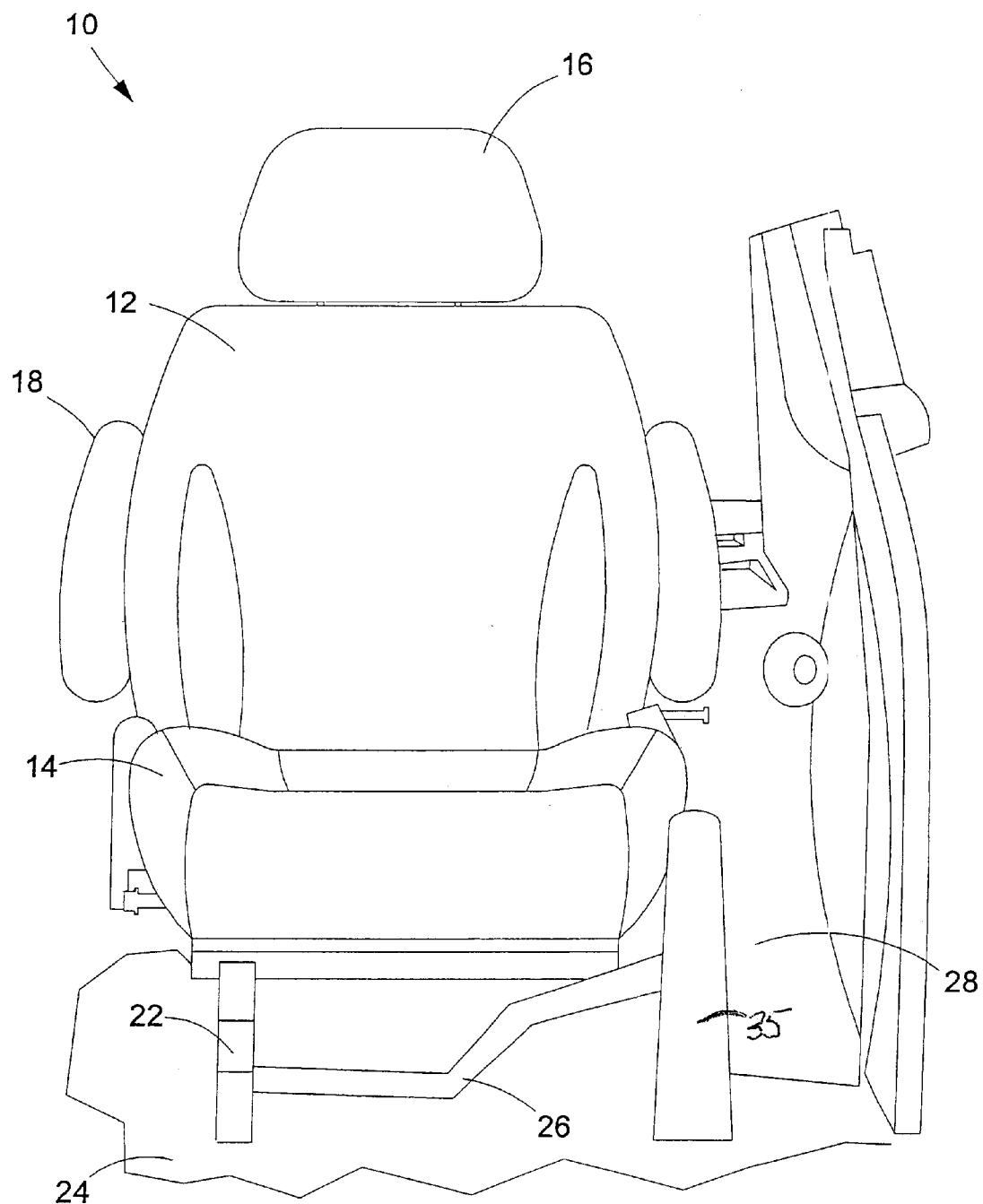
FIG. 1 is a front view of seat assembly according to the present invention for a motor vehicle in an upright, use position.

FIG. 1 shows one embodiment 10 of a seat assembly according to the present invention for a motor vehicle. The seat assembly 10 is normally a rear seat of the vehicle such as a minivan or a sport utility vehicle, and includes a seatback 12 and a seat cushion 14. The seatback 12 may assume a typical use position, as shown in FIG. 1, in which the seatback 12 is generally upright in order to support the back of an occupant. A conventional stationary or adjustable headrest 16, and a conventional pivotable arm rest 18, may also be provided.

Figure 2:
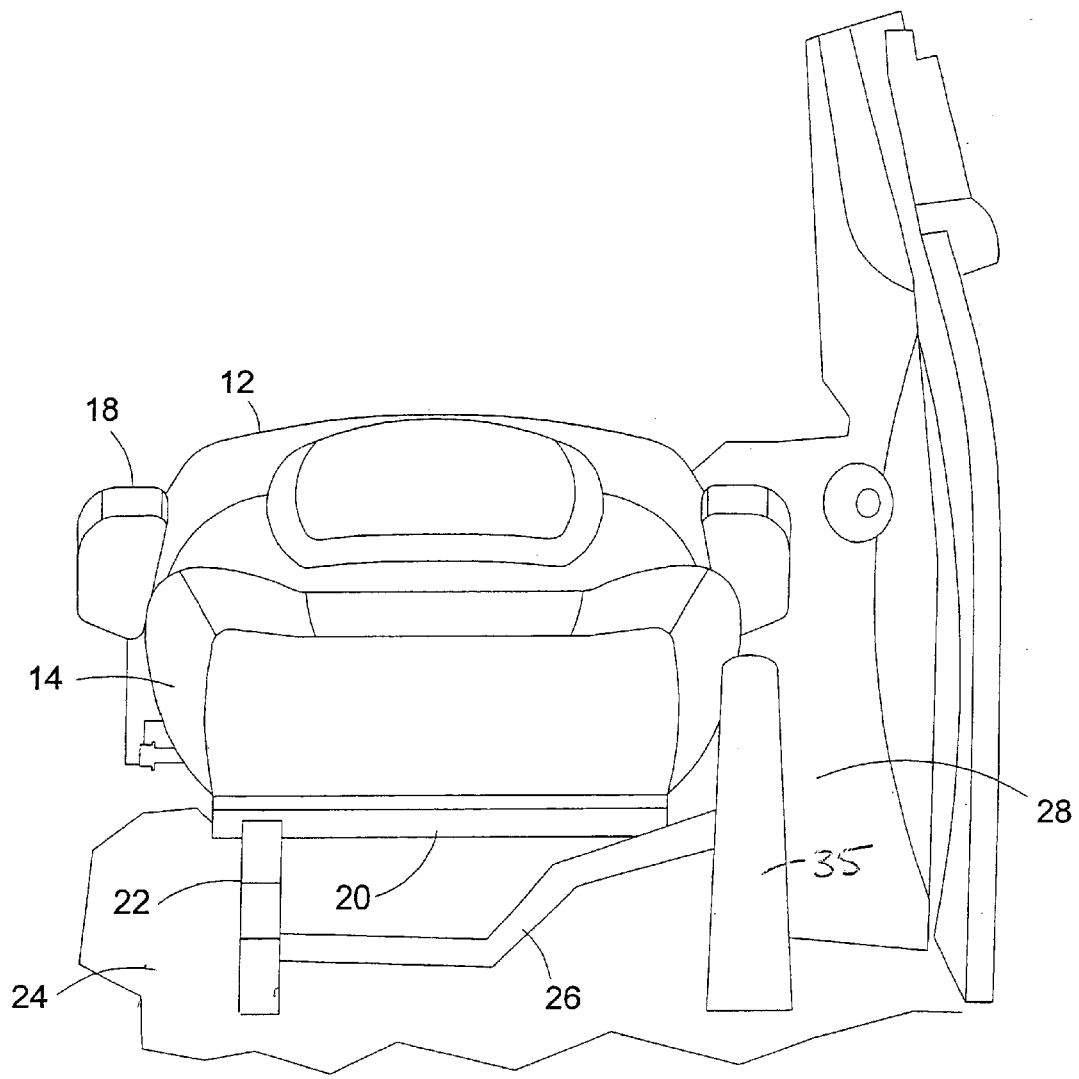
FIG. 2 is a front view of the seat assembly with a seatback is a folded position.

The seatback 12 is pivotable with respect to the seat cushion 14 about a generally horizontal axis, as is well known. FIG. 2 shows the seat assembly 10 with the seatback 12 in a folded-forward position. The seat cushion 14 includes a frame 20 to which is attached an inboard leg 22. The leg 22 is latchable, with any conventional latching and release mechanism, to a load floor 24 of the vehicle. A brace 26 extends generally below the seat cushion 14 between the leg 22 and a pivot mounted pivotable mounting on or proximate to a door or side wall 28 of the vehicle.

Figure 3:
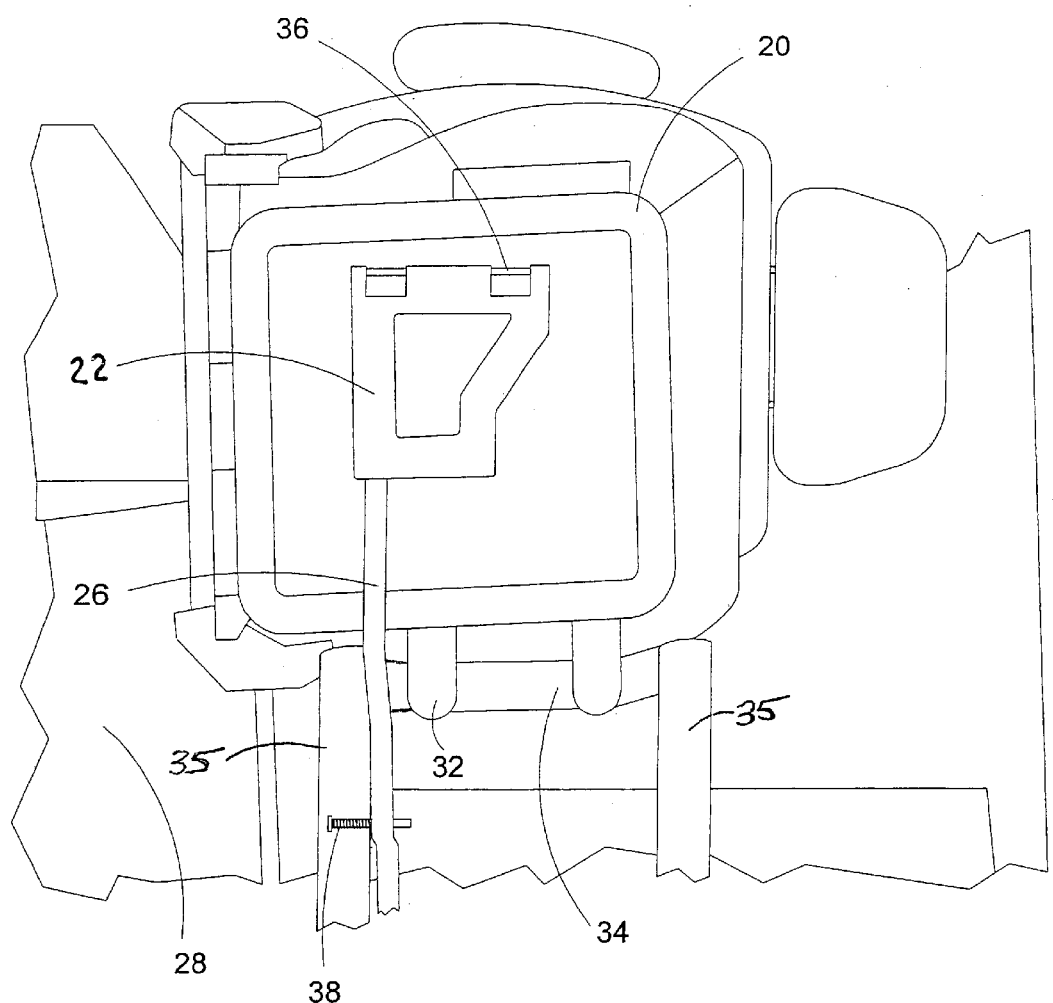
FIG. 3 is a side view of the seat assembly in a stowed position.
Figure 4:
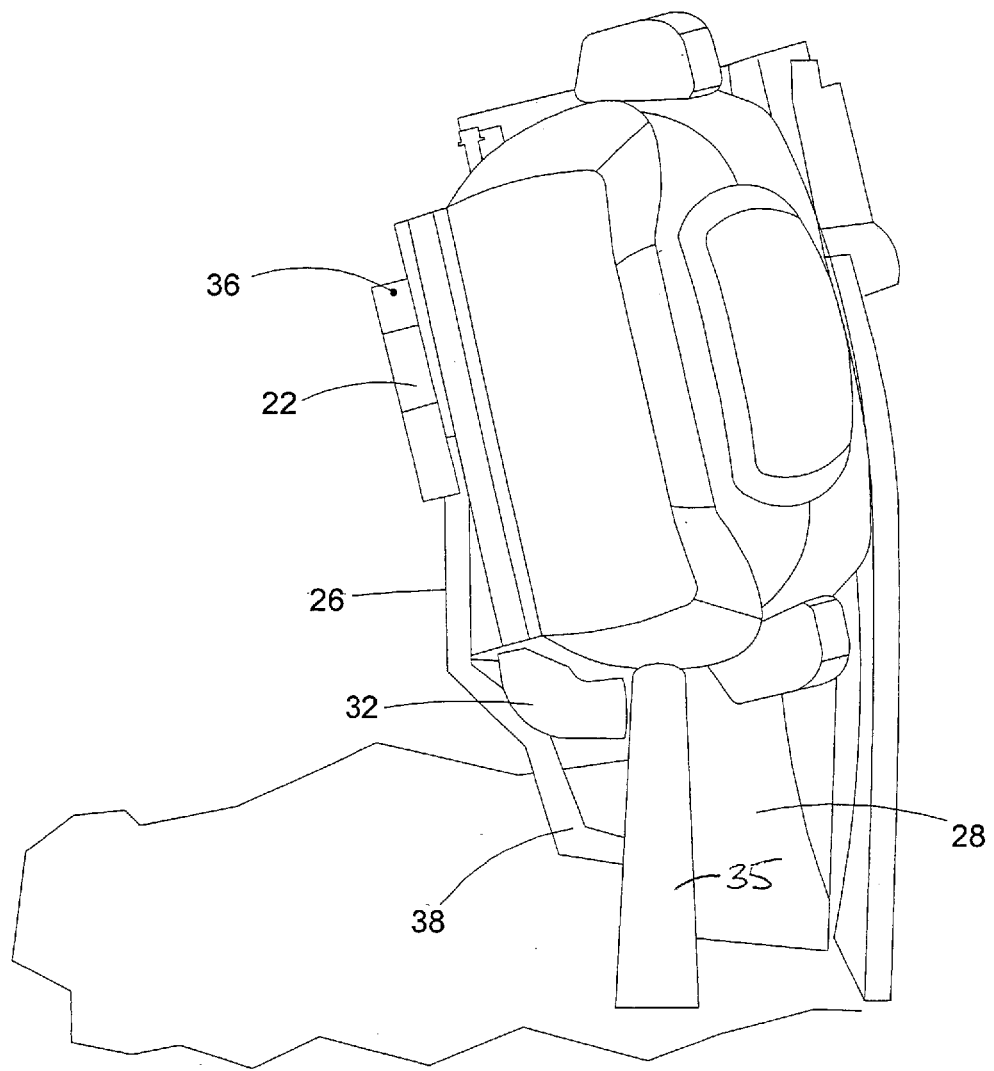
FIG. 4 is a front view of the seat assembly in the stowed position.

As shown in FIGS. 3 and 4, the seat assembly 10 is rotatable to a stowed position proximate the side wall 28 about a second generally horizontal axis that is perpendicular to the axis about which the seatback 12 pivots. To accomplish this, the seat cushion frame 20 includes a bracket 32 pivotably connected to a support 34 mounted near the side wall 28. In the illustrated embodiment, support 34 is positioned near the side wall 28 by stanchions 35 connected to the load floor 24. After the seatback 12 has been pivoted over the seat cushion 14, and the leg 22 has been released from the load floor 24, the entire seat assembly may be pivoted about the support 34 to the stowed position. During this operation, the outboard end of the brace 26 preferably rotates about a fixed pivot, while the inboard end of the brace may either slide in a slot (not shown) in the leg 22 or simply pull on the leg through a fixed pivot to draw the leg against the underside of the seat cushion, depending upon the precise dimensions involved. To facilitate its retraction, the leg 22 may be provided with spring-loaded pivot pins 36 to urge the leg to a position generally flush with the bottom of the seat cushion 14.

The seat may be locked in the stowed position through any suitable mechanism. In a preferred embodiment, a spring-loaded pin 38 may be inserted into a hole in the brace 26 to lock the seat in the upright position. The pin 38 may be retracted directly or through any suitable mechanism in order to allow the seat to rotate back toward the load floor 24.

The present invention thus provides a seat assembly that moves between a seating configuration and a configuration allowing the presentation of a relatively flat load floor. Moreover, the present invention is a cost effective method of facilitating ingress and egress for occupants of the rear seating row(s) of the motor vehicle.

While the embodiment of the invention disclosed herein is presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A seat assembly for a motor vehicle having a load floor and a side wall, the seat assembly comprising:

a seat cushion frame having an outboard end pivotally mounted to a fixed support proximate the side wall of the vehicle, the seat cushion frame being movable between a use position and a stowed position, wherein the stowed position is generally parallel to and proximate a side wall of the vehicle;

a seatback pivotally connected to the seat cushion frame; and a support leg pivotally mounted to an inboard end of the seat cushion frame, wherein the support leg is movable between a use position generally perpendicular to the seat cushion frame and the load floor of the vehicle for supporting the seat cushion frame and a stowed position parallel to and proximate the seat cushion frame;

a brace pivotally connecting the support leg and the fixed support, wherein the brace is pivotally connected to the support leg and the fixed support; and a pin for engaging the brace to lock the brace in a stowed position relative to the fixed support and thereby lock the seat cushion frame in the stowed position.

2. The seat assembly of claim 1 further comprising a headrest connected to the seatback.

3. The seat assembly of claim 1 further comprising an armrest connected to the seatback.

4. The seat assembly of claim 1 wherein the support leg is latchable to the load floor of the vehicle.

5. The seat assembly of claim 1 wherein the leg is normally biased toward the stowed position.

6. The seat assembly of claim 1, wherein the brace extends from the leg to the side wall of the vehicle.

7. The seat assembly of claim 6 wherein the brace is pivotally connected to the side wall of the vehicle.

8. A seat assembly for a motor vehicle having a load floor and a side wall, the seat assembly comprising:

a fixed seat support proximate the side wall;

a seat cushion frame having an outboard end pivotally mounted to the fixed seat support, the seat cushion frame being movable between a use position and a stowed position, wherein the stowed position is generally parallel to and proximate the side wall of the vehicle;

a support leg pivotally mounted to an inboard end of the seat cushion frame, wherein the support leg is movable between a use position generally perpendicular to the seat cushion frame and the load floor of the vehicle for supporting the seat cushion frame and a stowed position parallel to and proximate the seat cushion frame, wherein the leg is normally biased toward the stowed position; and a brace pivotally connected to the support leg and to the fixed seat support;

wherein the seat cushion frame, the fixed seat support, the brace and the support leg are pivotally connected to form a parallel linkage, whereby moving the seat cushion frame from the use position to the stowed position causes the support leg to remain substantially parallel to the fixed support and move to the stowed position as the brace also moves to the stowed position.

* * * * *